United States Patent [19]
Faber

[11] 3,762,828
[45] Oct. 2, 1973

[54] DRILL WITH GUIDE DEVICE

[75] Inventor: Kurt Heinrich Albert Erich Faber, Sandviken, Sweden

[73] Assignee: Sandvik Aktiebolag, Sandviken, Sweden

[22] Filed: Sept. 7, 1971

[21] Appl. No.: 178,187

[30] Foreign Application Priority Data
Sept. 29, 1970 Sweden.....................13185/70

[52] U.S. Cl.................... 408/83, 408/226, 408/705, 175/325, 175/408, 308/4 A
[51] Int. Cl............................................ B23b 51/00
[58] Field of Search.................. 408/83, 81, 80, 79, 408/705, 226; 175/325, 408; 308/4 A

[56] References Cited
UNITED STATES PATENTS

| | | | |
|---|---|---|---|
| 1,996,322 | 4/1935 | Carlson | 175/408 X |
| 3,389,621 | 6/1968 | Wear | 408/83 |
| 3,033,062 | 5/1962 | Carlstedt | 408/83 X |

FOREIGN PATENTS OR APPLICATIONS 271,839  3/1928  Great Britain..................... 175/325

*Primary Examiner*—Gil Weidenfeld
*Attorney*—Pierce, Scheffler & Parker

[57] ABSTRACT

A drilling tool comprising a drill head fixed to a rotatable drill shaft is provided with a special guide device consisting essentially of roller bodies (balls or rollers) retained in bearing rings positioned on the drill shaft adjacent to the drill head. The position of the roller bodies can be adjusted so that they bear with selected pressure against the surface of a drill hole thereby plastically working such surface.

1 Claim, 3 Drawing Figures

DRILL WITH GUIDE DEVICE

The present invention relates to a support or guide device mounted on a drill, the same consisting of one or more bearing rings enclosing roller bodies, such as balls or rollers, arranged to run against the wall of the bore hole. The guide device may be provided with special means for adjusting the position of the roller bodies.

In drilling, particularly in long-hole drilling, it is common to use one or more guide pads, arranged to support and guide the drill along the bore hole. These guide pads are often elongated rectangular plates of hard metal placed in the front part of the drill and having the same direction of length as the tool. It previously has been known that guide pads may, to a certain extent, plastically work the hole surface with improved surface finish and gauge accuracy as a result. Sometimes there are more supporting and guiding members applied between the guide pads and the drill shaft, and sometimes also on the drill shaft itself. Such members often consist of wood or "Bakelite" supports which slide against the surface of the bore hole. These last-mentioned support members have often shown considerable drawbacks or deficiencies, particularly when very accurate guidance of the boring tool was demanded.

The present invention provides a solution of these problems, and gives at the same time possibilities of further improvement of surface finsih and gauge accuracy of the boring hole.

The invention will be described in detail in the following specification taken with the appended drawings in which.

Figure 1:
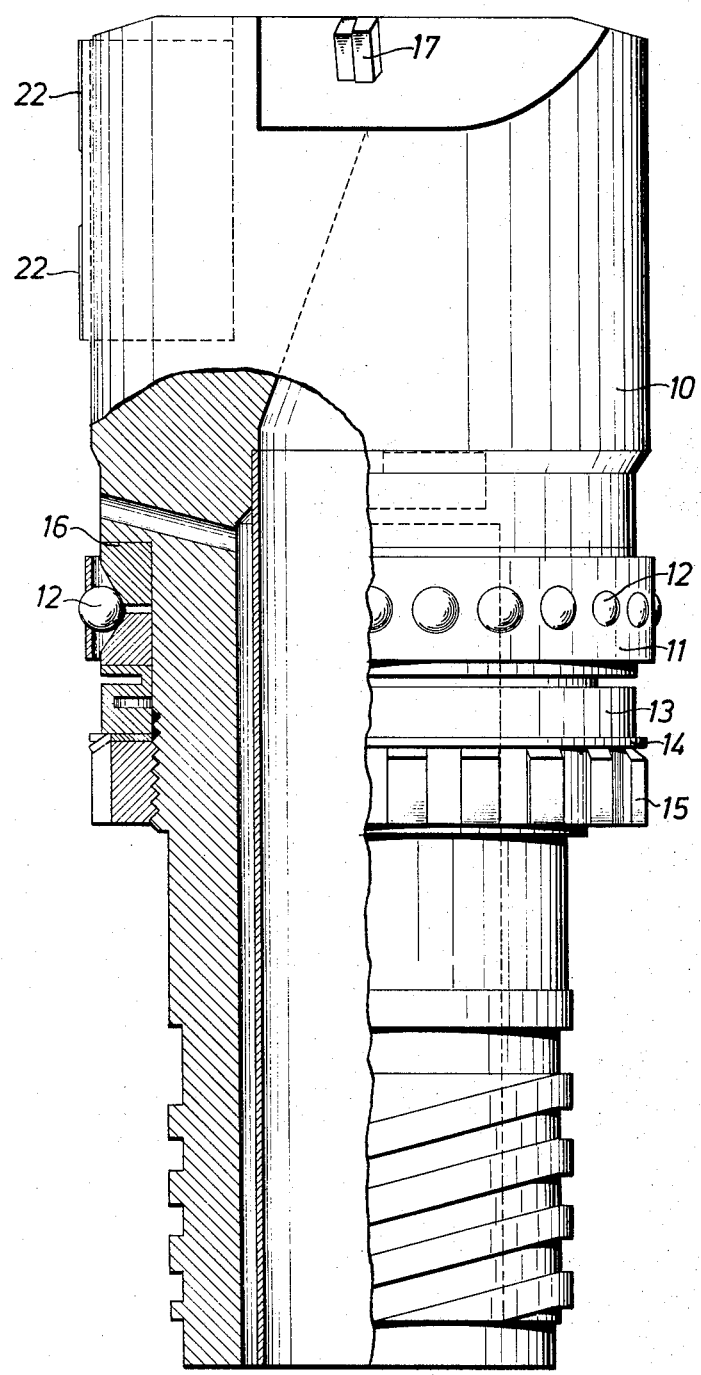
FIG. 1 represents, in side view, a boring tool according to the invention.
Figure 2:
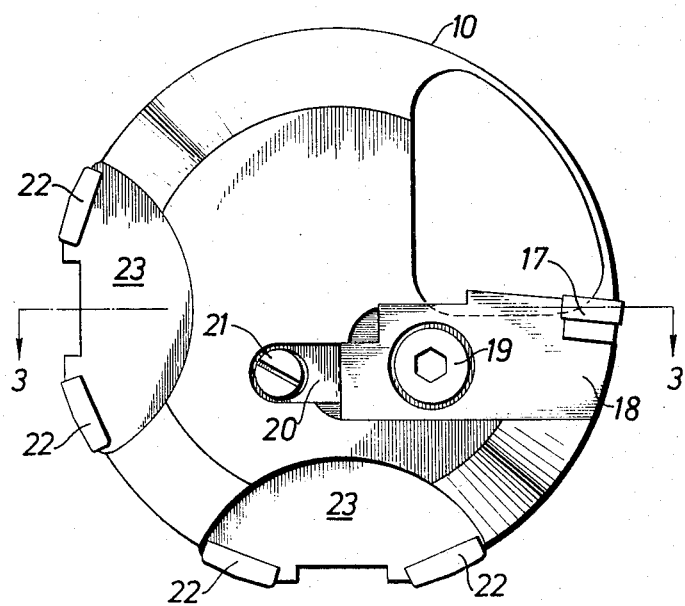
FIG. 2 is an end view of the tool shown in FIG. 1.
Figure 3:
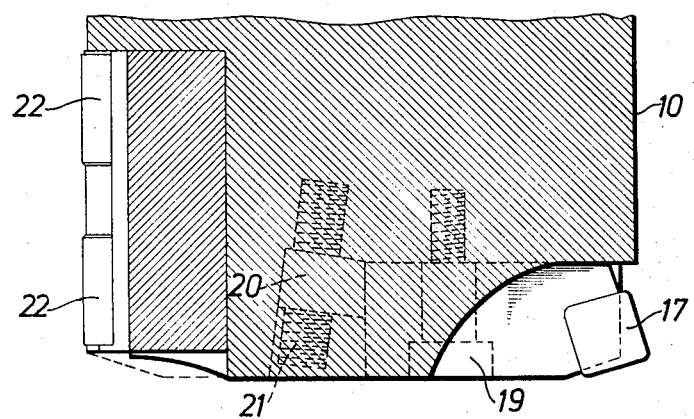
FIG. 3 is a cross-section on line 3—3 of FIG. 2.

The tool shown in FIGS. 1-3 consists of a drill or tool body 10 and a guide device applied to the drill per se, said guide device consisting of a ball holder 11 with balls 12, 12, elastic spacer 13, lock washer 14 and shaft nut 15. The balls 12, 12 run in two ball rings 16, 16. By turning the shaft nut 15, the position of the balls can be adjusted and a suitable contact pressure against the surface of the bore hole can be maintained.

The drill 10, which in the shown embodiment is a reaming tool, has an insert 17 of hard metal or other wear-resistant material. The insert is placed in a tool holder 18, which in its turn is fixed to the tool body by means of a screw 19 and supported by a wedge 20 which in its turn is regulated by the screw 21. In order to support and guide the drill head, the latter is provided with guide pads 22, desirably formed of hard metal and mounted in movably positioned support bodies 23.

It is to be realized that the invention is applicable also in other types of drilling than reaming. Thus, it may also be used in tools for full face boring and for core drilling.

It had earlier been mentioned that the position of the roller bodies can be adjusted in order to obtain a suitable contact pressure against the surface of the bore hole. By means of the invention the contact pressure can be adjusted to give either guidance only or guidance in combination with press polishing and sizing. In the last-mentioned case, the balls or rollers are set with a higher pressure against the surface of the hole and some kind of press polishing of the surface is done.

According to the invention, also, other devices than the shown embodiment may be used for adjusting the position of the roller bodies. As an example, the flexible spacer 13 may be omitted and sufficient possibilities of adjustment be obtained by means of suitably selected flexibility of the ring or rings 16.

The rollers usually have a cylindrical or conical form. In the case of conical rollers which may be supported by an inclined plane in order to give mainly plain contact against the wall of the bore hole, adjustment in the position of the rollers may suitably be effected by axial movement of rollers and/or their support.

What I claim is:

1. A tool for machining a metal object, said tool comprising
    a rotatable drill holder in the form of a drill shaft;
    a drill head adapted to said drill holder;
    said drill head having at least one guide pad;
    at least one separate guide device on said drill shaft,
    said guide device comprising at least one ring supporting roller bodies adapted to run against the surface of a bore hole in such object, said guide device having annular means for adjusting the axial position of said ring with respect to said drill head, said adjusting means comprising a spacer, a lock washer and a shaft nut.

* * * * *